United States Patent
Lin et al.

(10) Patent No.: US 12,518,386 B2
(45) Date of Patent: Jan. 6, 2026

(54) IMAGE PROCESSING APPARATUS AND IMAGE-BASED TEST STRIP IDENTIFICATION METHOD

(71) Applicant: Wistron Corporation, New Taipei (TW)

(72) Inventors: Zhao-Yuan Lin, New Taipei (TW); Jia-Jiun Yang, New Taipei (TW)

(73) Assignee: Wistron Corporation, New Taipei (TW)

(*) Notice: Subject to any disclaimer, the term of this patent is extended or adjusted under 35 U.S.C. 154(b) by 589 days.

(21) Appl. No.: 17/397,993

(22) Filed: Aug. 10, 2021

(65) Prior Publication Data

US 2022/0392071 A1 Dec. 8, 2022

(30) Foreign Application Priority Data

Jun. 4, 2021 (TW) .................................. 110120475

(51) Int. Cl.
H04N 9/69 (2023.01)
G06T 7/00 (2017.01)

(52) U.S. Cl.
CPC .. G06T 7/0014 (2013.01); *G06T 2207/20021* (2013.01); *G06T 2207/30004* (2013.01)

(58) Field of Classification Search
CPC ......... G06T 7/0014; G06T 2207/20021; G06T 2207/30004
USPC ........................................................ 382/128
See application file for complete search history.

(56) References Cited

U.S. PATENT DOCUMENTS

| | | | |
|---|---|---|---|
| 10,140,775 B2 | 11/2018 | Oba et al. | |
| 10,956,810 B1* | 3/2021 | Wright | G06N 20/00 |
| 2004/0095360 A1* | 5/2004 | Tseng | H04N 1/00063 |
| | | | 345/619 |
| 2016/0139156 A1 | 5/2016 | Lakdawala | |
| 2017/0103543 A1* | 4/2017 | Kusuhara | G06T 5/00 |

FOREIGN PATENT DOCUMENTS

| | | |
|---|---|---|
| JP | 6232994 | 11/2017 |
| TW | 201901138 | 1/2019 |
| TW | M588797 | 1/2020 |

OTHER PUBLICATIONS

Zheng et al., "Simultaneous Quantitative Detection of Helicobacter Pylori based on a Rapid and Sensitive Testing Platform using Quantum Dots-Labeled Immunochromatiographic Test Strips" 2016. Nanoscale Research Letters, SpringerOpen Journal (Year: 2016).*
"Office Action of Taiwan Counterpart Application", issued on Jun. 2, 2022, pp. 1-12.

* cited by examiner

*Primary Examiner* — Stephen S Hong
*Assistant Examiner* — Tionna M Burke
(74) *Attorney, Agent, or Firm* — JCIPRNET

(57) ABSTRACT

An image processing apparatus and an image-based test strip identification method are provided. In the method, multiple representative values on a first axis of a test strip image are determined. The test strip image is obtained by capturing a test strip. A second axis parallel to a test line or a control line of the test strip is perpendicular to the first axis. A test result of the test strip is determined according to a difference between a first representative value and a second representative value of the representative values. The test result includes a positive result and a negative result.

11 Claims, 15 Drawing Sheets

IMAGE PROCESSING APPARATUS AND IMAGE-BASED TEST STRIP IDENTIFICATION METHOD

CROSS-REFERENCE TO RELATED APPLICATION

This application claims the priority benefit of Taiwanese application no. 110120475, filed on Jun. 4, 2021. The entirety of the above-mentioned patent application is hereby incorporated by reference herein and made a part of this specification.

BACKGROUND

Technical Field

The disclosure relates to a test strip identification technology; particularly, the disclosure relates to an image processing apparatus and an image-based test strip identification method.

Description of Related Art

For some diseases (e.g., pneumonia, flu, or diabetes) or body status (e.g., ovulation or pregnancy), if rapid screening tests are intended, medical practitioners may use relevant test strips for the tests. However, most medical practitioners judge positive and negative reactions on the test strips manually by visual observation. Where the reactions on the test strips are not obvious, only vision and intuition of the medical practitioners can be relied on, thereby increasing the misjudgment rate.

SUMMARY

An embodiment of the disclosure provides an image processing apparatus and an image-based test strip identification method, in which positive and negative reactions are identified based on a numerical difference between different positions on a test strip image, reducing the misjudgment rate.

According to an embodiment of the disclosure, an image-based test strip identification method includes (but is not limited to) the following. A plurality of representative values on a first axis of a test strip image are determined. The test strip image is obtained by capturing a test strip. A second axis parallel to a test line or a control line of the test strip is perpendicular to the first axis. A test result of the test strip is determined according to a difference between a first representative value and a second representative value of the representative values. The test result includes a positive result and a negative result.

According to an embodiment of the disclosure, the image processing apparatus includes (but is not limited to) a storage device and a processor. The storage device stores a programming code. The processor is coupled to the storage device. The processor is configured to be loaded with the programming code to determine a plurality of representative values on a first axis of a test strip image, and determine a test result of the test strip according to a difference between a first representative value and a second representative value of the representative values. The test strip image is obtained by capturing a test strip. A second axis parallel to a test line or a control line of the test strip is perpendicular to the first axis. The test result includes a positive result and a negative result.

Based on the foregoing, according to the embodiments of the disclosure, in the image processing apparatus and the image-based test strip identification method, the test strip is identified as positive or negative based on a variation (i.e., the difference) between the two representative values on the first axis of the test strip image. Accordingly, the identification accuracy of positive and negative reactions can be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
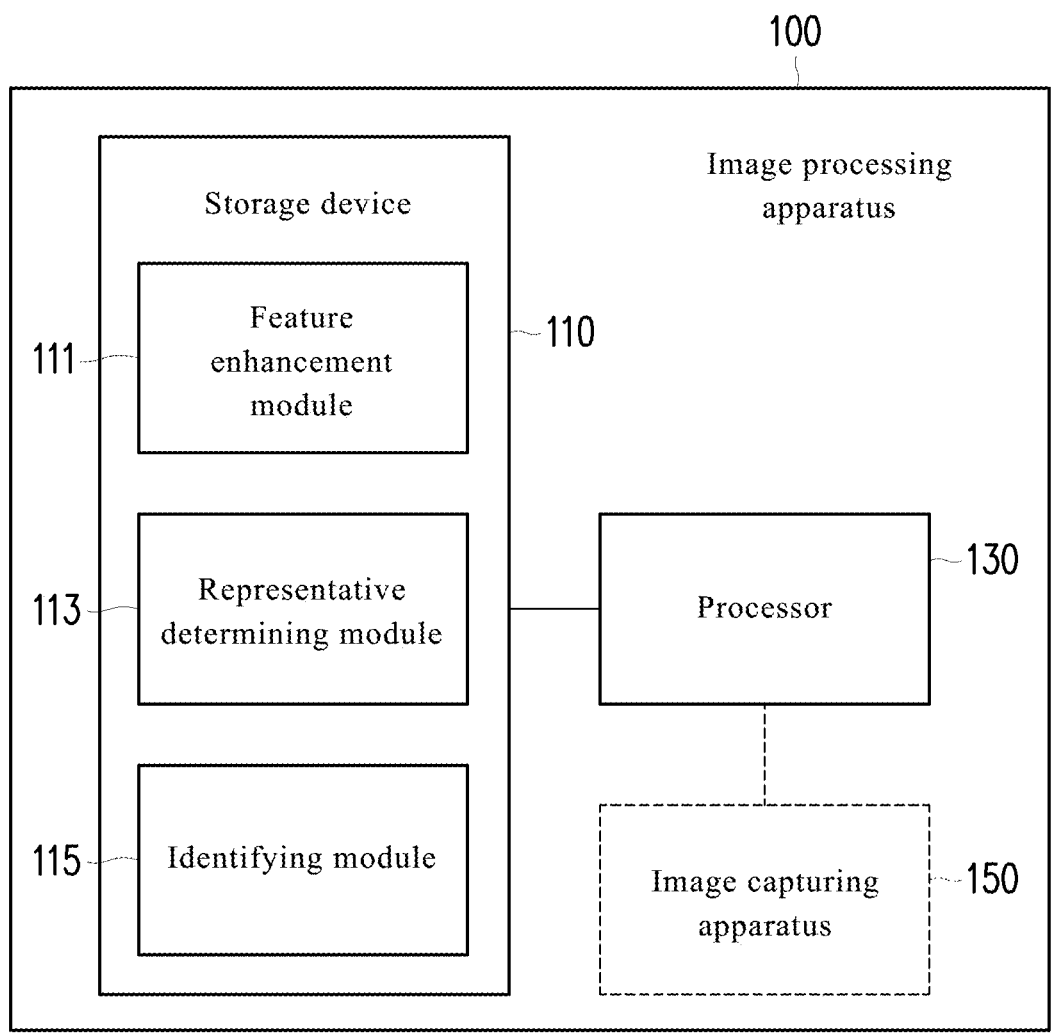
FIG. 1 is a block diagram of elements of an image processing apparatus according to an embodiment of the disclosure.

FIG. 1 is a block diagram of elements of an image processing apparatus 100 according to an embodiment of the disclosure. With reference to FIG. 1, an image processing apparatus 100 includes (but is not limited to) a storage device 110 and a processor 130. The image processing apparatus 100 may be a desktop computer, a notebook computer, a smart phone, a tablet computer, a server, a medical testing instrument, or other computing devices.

The storage device 110 may be any form of fixed or mobile random access memory (RAM), read only memory (ROM), flash memory, hard disk drive (HDD), solid-state drive (SSD), or similar elements. In an embodiment, the storage device 110 is configured to record a programming code, a software module (e.g., a feature enhancement module 111, a representative determining module 113, or an identifying module 115), a configuration, data (e.g., an image, a representative value, a difference, a reference value, a distance, or a threshold), or files, and the embodiment will be described in detail later.

The processor 130 is coupled to the storage device 110. The processor 130 may be a central processing unit (CPU), a graphic processing unit (GPU), or any other programmable general-purpose or special-purpose microprocessor, digital signal processor (DSP), programmable controller, field programmable gate Array (FPGA), application-specific integrated circuit (ASIC), neural network accelerator, or other similar elements or a combination of the above elements. In an embodiment, the processor 130 is configured to perform each or part of tasks of the image processing apparatus 100, and may be loaded with and execute the programming codes, software modules, files, and data recorded in the storage device 110.

In an embodiment, the image processing apparatus 100 also includes an image capturing apparatus 150. The image capturing apparatus 150 is coupled to the processor 130. The image capturing apparatus 150 may include an image sensor (e.g., charge coupled device (CCD) or complementary metal-oxide-semiconductor (CMOS)), an optical lens, an image control circuit, and an image processor, among other elements.

In an embodiment, the lens specification (e.g., imaging aperture, magnification, focal length, imaging viewing angle, or image sensor size) and the number of lenses of the image capturing apparatus 150 may be adjusted depending on actual requirements.

In an embodiment, the image capturing apparatus 150 is configured to obtain a test strip image by capturing a test strip. The test strip may be directed to specific diseases (e.g., pneumonia, flu, or diabetes), body status (e.g., pregnancy or ovulation), or other types of tests.

Hereinafter, the method according to an embodiment of the disclosure accompanied with various apparatuses, elements, and modules in the image processing apparatus 100 will be described. Each flow of the method may be adjusted depending on the actual circumstances of implementation, and is not limited thereto.

Figure 2:
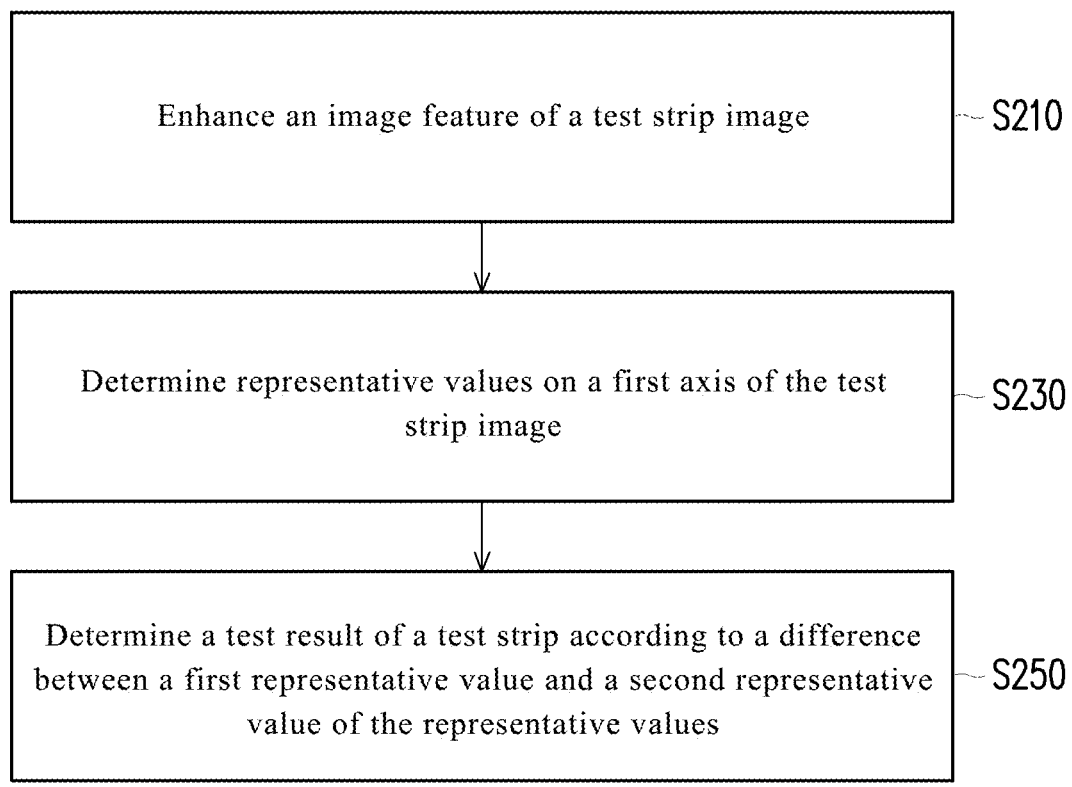
FIG. 2 is a flowchart of an image-based test strip identification method according to an embodiment of the disclosure.

FIG. 2 is a flowchart of an image-based test strip identification method according to an embodiment of the disclosure. With reference to FIG. 2, the feature enhancement module 111 may enhance an image feature of a test strip image (step S210). Specifically, the processor 130 may obtain the test strip image through the built-in or externally connected image capturing apparatus 150. Alternatively, the processor 130 may download the test strip image from a server, a computer, or a storage medium. In addition, the image feature is provided for subsequent determination of negative and positive reactions or identification of a control line.

Figure 3:
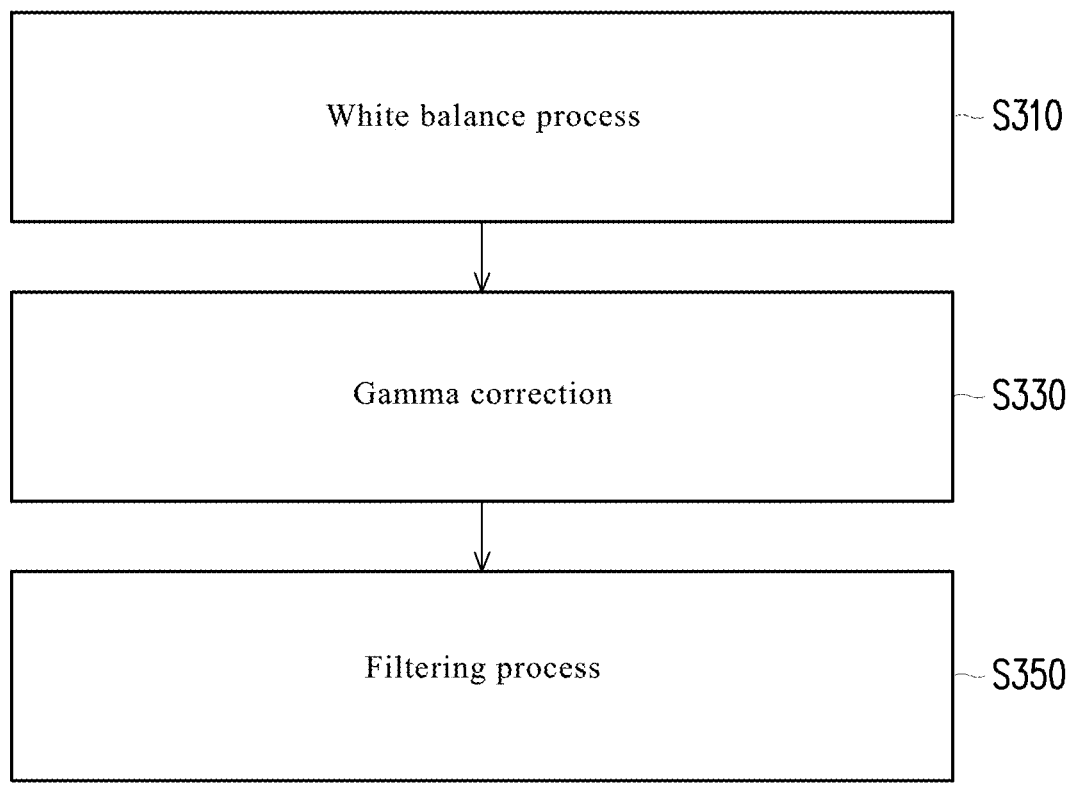
FIG. 3 is a flowchart of image feature enhancement according to an embodiment of the disclosure.

In an embodiment, the feature enhancement module 111 may perform a white balance process, a gamma correction, and/or a filtering process on the test strip image. For example, FIG. 3 is a flowchart of image feature enhancement according to an embodiment of the disclosure. With reference to FIG. 3, in some application scenarios, since light sources in capturing a test strip may have different color temperatures (e.g., 4500K to 6000K), test strip images from different sources may have different white balances. The feature enhancement module 111 may perform a white balance process on the initial test strip image (step S310). In an embodiment, the feature enhancement module 111 may determine a target color temperature. For example, the target color temperatures of red, green, and blue are respectively 101, 205, and 164, but not limited thereto. The feature enhancement module 111 may obtain a statistic (e.g., mean, median, or mode) of the strength of each primary color of the entire or partial test strip image, and may adjust each or part of pixels in the test strip image according to a ratio (or referred to as magnification) of the target color temperature to the statistic. For example, a mathematical formula of the white balance process is:

$$\text{New\_R} = TR/\text{AVG\_R}(X\_R) * R \quad (1)$$

where X_R is the strength of a certain red pixel in the input/initial test strip image, new_R is the strength (corresponding to the target color temperature) of the red pixel after white balance, and AVG_R is the mean of the red pixels of the entire test strip image. The formulae for the other primary colors may be obtained by analogy.

Note that, in other embodiments, the feature enhancement module 111 may also adopt other white balance corrections, or ignore/disable the white balance process.

In some application scenarios, the improvement of the degree of difference in color rendering facilitates subsequent identification of negative or positive reaction. The feature enhancement module 111 may perform gamma correction on the test strip image (step S330). For example, the mathematical formula of the gamma correction is:

$$V_{out} = A V_{in}^{r} \quad (2)$$

where $V_{out}$ is the output value; A is a constant, for example, 1.0; $V_{in}$ is the input value (the strength of the primary color of a certain pixel in the initial or white balance-corrected test strip image); and r is the correction parameter, for example, 1.5.

Note that, in other embodiments, the feature enhancement module 111 may also adopt other gamma corrections, or ignore/disable the gamma correction.

In some application scenarios, the test strip may be stained. The feature enhancement module 111 may perform a filtering process on the test strip image (step S350). For example, the filtering process is median filtering, mean filtering, Gaussian filtering, or box filtering. In some embodiments, the filtering process may also be changed to blurring.

Note that, in other embodiments, the feature enhancement module 111 may also adopt other filtering processes, or ignore/disable the filtering process. In addition, in some embodiments, it is possible that the sequence of step S310 to step S350 is changed, that any one, any two, or each of step S310 to S350 is ignored, or that contrast adjustment, shadow adjustment, or other image processing is adopted.

The representative determining module 113 may determine one or more representative values on the first axis of the test strip image (step S230). Specifically, assuming that the axis parallel to a test line and/or a control line of the test strip is referred to as a second axis, then the second axis is perpendicular to the first axis. Taking FIG. 6A as an example, a control line CL is parallel to the vertical axis (namely parallel to the longitudinal direction of the drawing) and perpendicular to the horizontal axis (namely parallel to the lateral direction of the drawing).

Notably, the control line and/or the test line renders color or changes color in reaction to specific reagents, and the control line and/or the test line after reaction typically have different chromas, brightnesses, and/or hues from adjacent regions (e.g., one or more columns of pixels other than the control line or the test line) on the first axis. Therefore, determining the variation and/or difference between adjacent sections (e.g., spaced by one or more pixels) on the first axis facilitates subsequent identification of reaction. Each representative value (as an image feature) may correspond to one of a plurality of sections divided from the test strip image on the first axis. That is, each representative value may be regarded as a representative value of the section. Depending on different application scenarios, the representative determining module 113 may longitudinally divide the test strip image into a plurality of sections. Taking FIG. 6B as an example, the representative determining module 113 divides, once by an adjacent pixel, the test strip image along the direction parallel to the control line CL, and then determines the representative value of each column of pixels.

Figure 4:
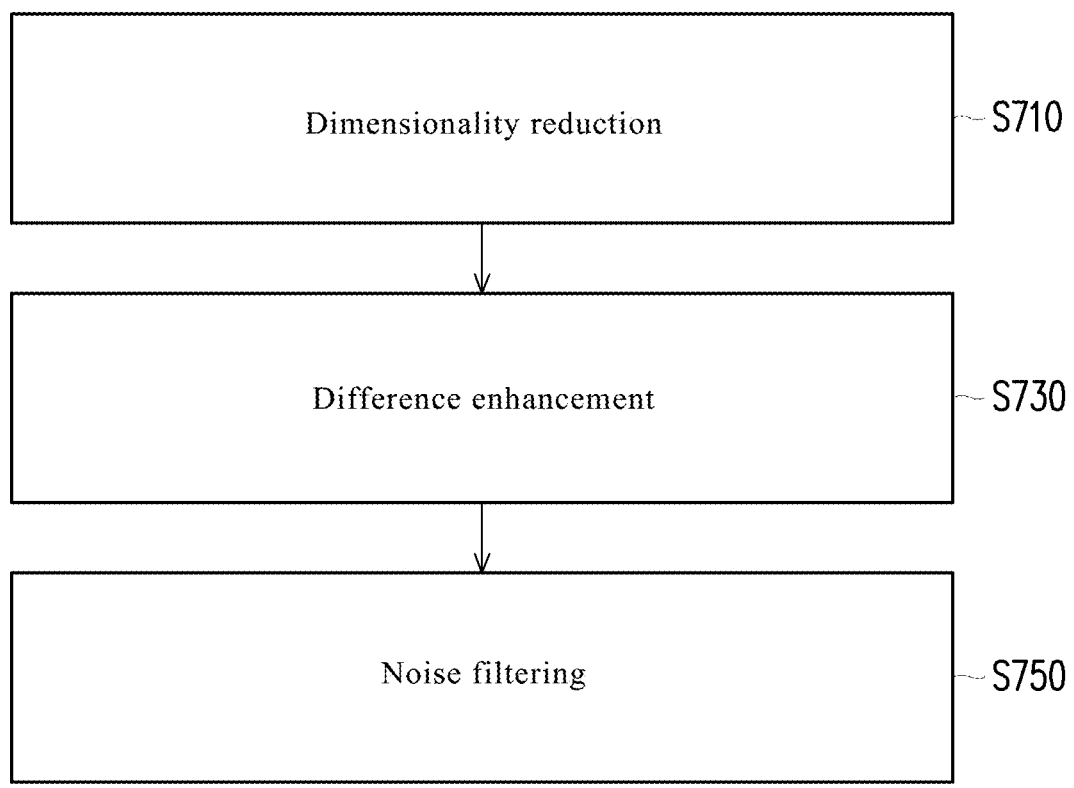
FIG. 4 is a flowchart of determining representative values according to an embodiment of the disclosure.

FIG. 4 is a flowchart of determining representative values according to an embodiment of the disclosure. Referring to FIG. 4, in an embodiment, the representative determining module 113 may determine a plurality of corresponding statistically representative values corresponding to statistics of the sections on the first axis (i.e., dimensionality reduction processing (step S710)) according to the statistics. The statistics may be mean, median, mode, or other values obtained by performing functional operations on each or part of the pixels in the sections. For example, the representative determining module 113 determines the mean of each column of pixels in the test strip image as the statistically representative value of each column of pixels. In addition, the representative value is related to the statistically representative values. For example, the representative value is the statistically representative value or a value obtained by performing a functional operation on the statistically representative value. Similarly, each statistically representative value also corresponds to one of the sections divided from the test strip image on the first axis. That is, the representative values and the sections are in a one-to-one matching/mapping. Accordingly, two-dimensional data of the test strip image may be converted into one-dimensional data.

In another embodiment, the representative determining module 113 may adopt other data dimensionality reduction processes, for example, main feature extraction, sampling, or matrix operations, on the sections in the test strip image.

In an embodiment, the representative determining module 113 may determine one of a plurality of difference representative values according to a difference between each statistically representative value and another statistically representative value spaced by a stride distance (i.e., enhance the difference (step S730)). To further highlight the difference between the reaction region (e.g., the test line and/or the control line) and the non-reaction region (the regions other than the test line or the control line), the representative determining module 113 may directly generate a representative value according to the difference. Notably, if the difference between statistically representative values in two positions on the test strip image is relatively little (e.g., less than a specific threshold), it means that the two positions both belong to the reaction region or to the non-reaction region. On the contrary, if the difference between statistically representative values in two positions on the test strip image is relatively great (e.g., greater than the threshold), it means that the two positions are respectively located in the reaction region and the non-reaction region. In addition, the difference representative values may serve as representative values. Moreover, the stride distance is related to the width of the test line or the control line on the first axis. For example, if the width of the test line is 10 pixels, then the stride distance is 5 to 8 pixels. That is, the difference between the width and the stride distance is less than the corresponding threshold, but not limited thereto.

In an embodiment, the representative determining module 113 may determine a calculated value of a connecting line formed by each statistically representative value after a finite difference according to the stride distance. Assuming that, in a coordinate system, the x-axis corresponds to the first axis (i.e., positions, for example, a certain column of pixels) and the y-axis corresponds to the second axis (i.e., representative values, for example, the strength of primary color). The statistically representative values may define points in the coordinate system, and the points form a connecting line (through the points). Assuming that the connecting line approaches a function, then a finite difference on the function is configured to find the approximate solution of the function. Herein, the finite difference includes evenly dividing a domain, namely limiting the range of the domain. In this embodiment, each calculated value may be one of the difference representative values, and the stride distance is related to the limited domain of the finite difference (i.e., division on the first axis).

Figure 5:
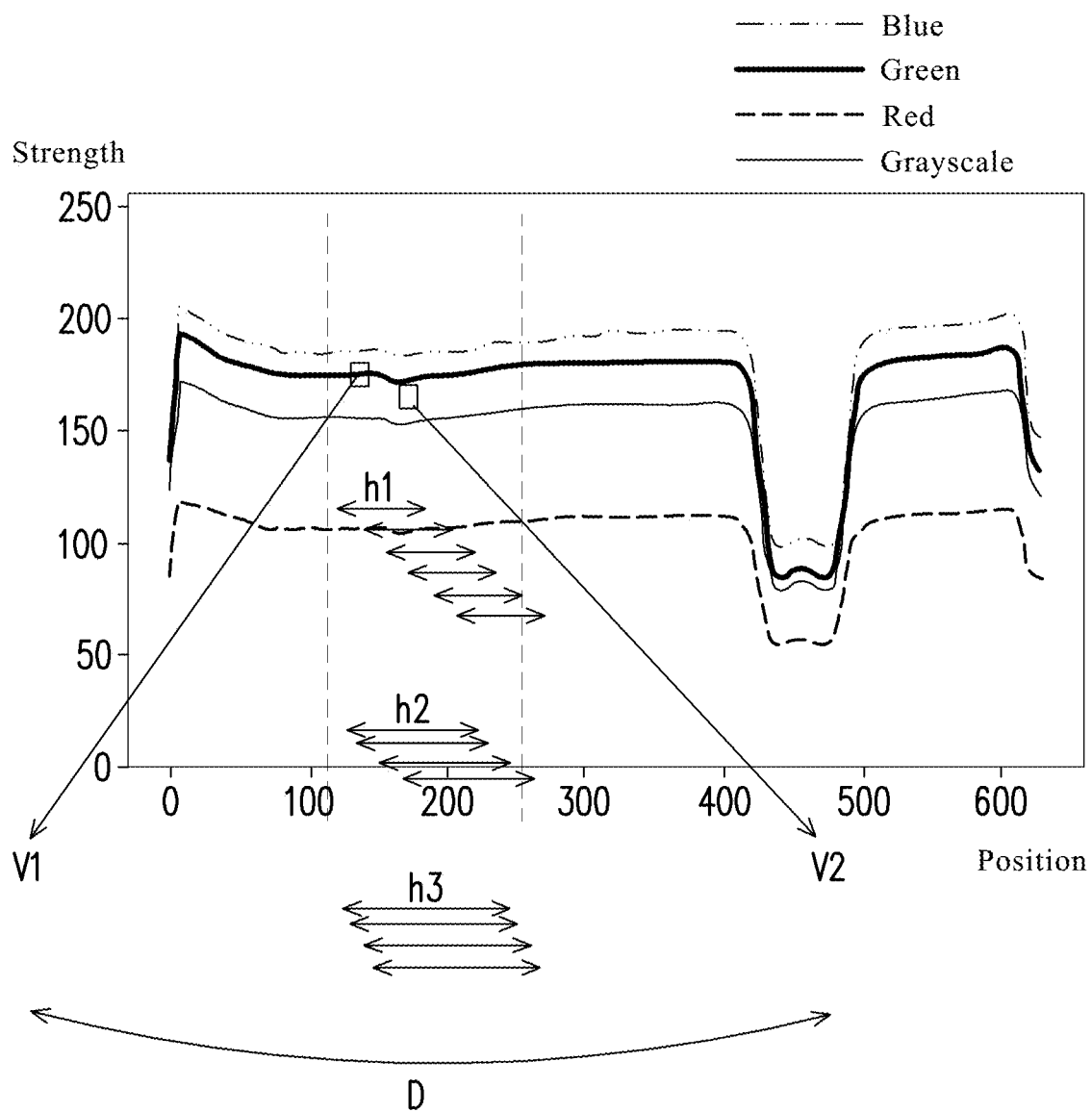
FIG. 5 is a schematic diagram of finite difference according to an embodiment of the disclosure.

For example, FIG. 5 is a schematic diagram of finite difference according to an embodiment of the disclosure. With reference to FIG. 5, the representative determining module 113 performs a finite difference on a plurality of statistically representative values of green. For example, the representative determining module 113 divides a difference value D between two statistically representative values V1, V2 (taking strengths as an example) at a distance of a stride distance h1 by the stride distance h1 to obtain a calculated value. In addition, the calculated value is a difference representative value. The representative determining module 113 may also determine the calculated value of adjacent values of the two statistically representative values V1, V2, and so on (the stride distance h1 shifted in the direction of the first axis as shown in the figure). Moreover, the stride distance h1 may also be changed into greater stride distances h2, h3.

Figure 6A:
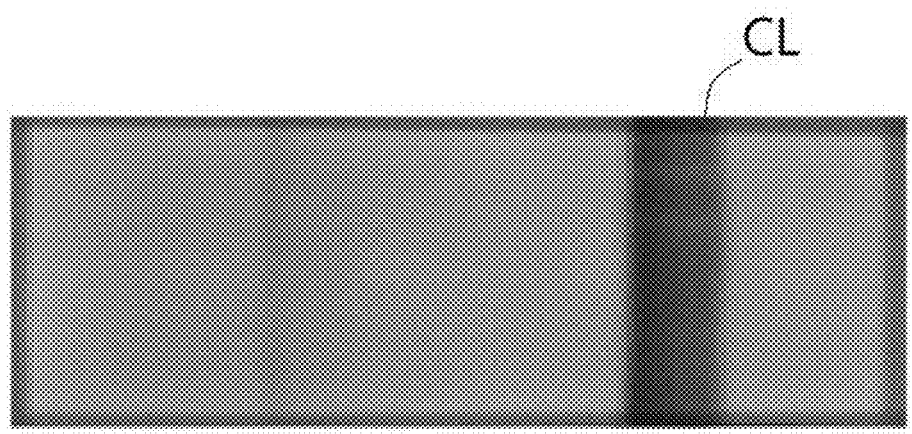
FIG. 6A is a schematic diagram of an initial test strip image according to an embodiment of the disclosure.
Figure 6B:
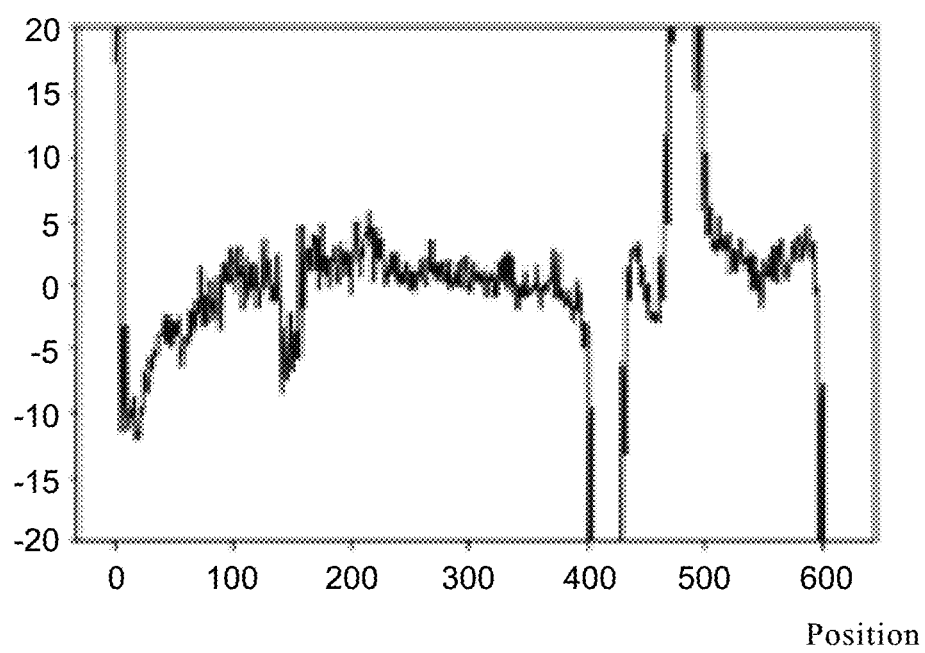
FIG. 6B is a schematic diagram of the image of FIG. 6A after a finite difference according to an embodiment of the disclosure.

FIG. 6A is a schematic diagram of an initial test strip image according to an embodiment of the disclosure, and FIG. 6B is a schematic diagram of the image of FIG. 6A after a finite difference according to an embodiment of the disclosure. With reference to FIG. 6A and FIG. 6B, the difference representative values obtained through the finite difference exhibit a great change near the position of the control line CL. For example, the difference representative value at position 400 on the first axis is −20, but the difference representative value at position 500 is 20.

In another embodiment, the representative determining module 113 may perform other functional operations, for example, difference of squares or difference of square roots, on two statistically representative values at a distance of a stride distance.

In an embodiment, the representative determining module 113 may perform a filtering process on the representative values to filter noise (step S750). The filtering process may be median filtering, mean filtering, or blurring.

Note that, in some embodiments, at least one of step S730 and step S750 may be ignored/disabled.

The identifying module 115 may determine a test result of the test strip according to the difference between the first representative value and the second representative value of the representative values (step S250). Specifically, as shown in FIG. 6A and FIG. 6B, the great change between the adjacent representative values may result from the color change or color rendering of the control line or the test line. Therefore, the difference between the representative values (as an image feature) may be adopted to determine color change or color rendering.

Figure 7:
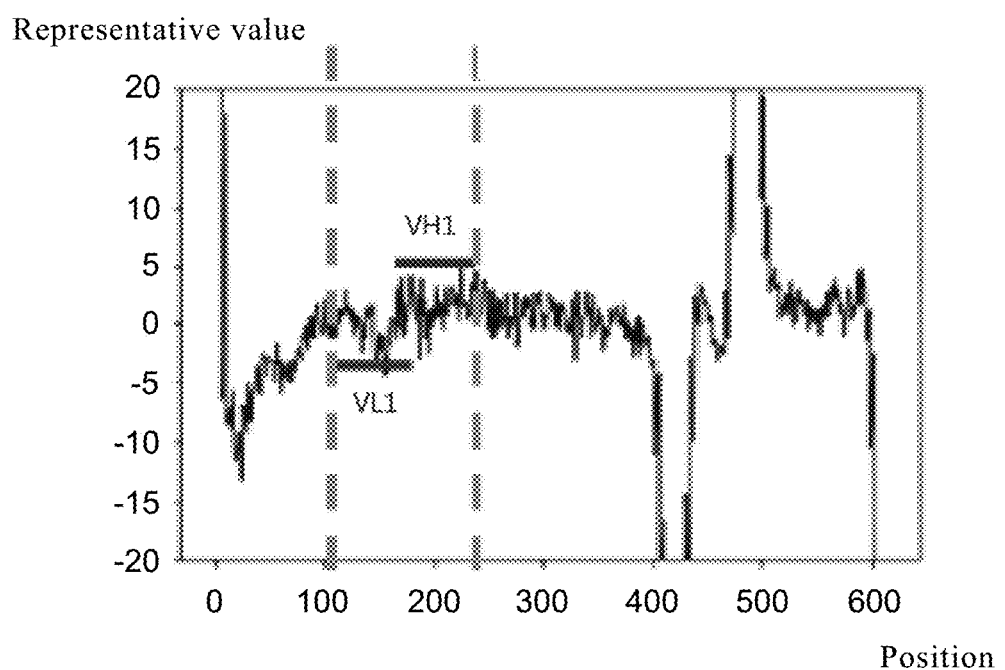
FIG. 7 is a schematic diagram showing feature calculation according to an embodiment of the disclosure.

For example, FIG. 7 is a schematic diagram showing feature calculation according to an embodiment of the disclosure. With reference to FIG. 7, in the interval (not limited to the width shown in the drawing) between two broken lines, a difference between a first representative value VH1 (e.g., the greatest value in the interval) and a second representative value VL1 (e.g., the least value in the interval) may serve as an image feature.

Note that, the first representative value VH1 shown in FIG. 7 is the greatest value and the second representative value VL1 shown in FIG. 7 is the least value. Nonetheless, in other embodiments, the first representative value VH1 may also be selected from the second greatest value, the third greatest value, or values in other orders; and the second representative value VL1 may also be selected from the second least value, the third least value, or values in other orders. In an embodiment, the first representative value VH1 is greater than the second representative value VL1. In another embodiment, the first representative value VH1 is less than or equal to the second representative value VL1.

In addition, the test result includes a positive result and a negative result. Generally speaking, when the test line renders color or changes color, it indicates a positive result, and when the test line does not renders color or changes color, it indicates a negative result, but not limited thereto (the opposite case may be possible). Therefore, the occurrence of color change or color rendering represents a positive result, and the contrary represents a negative result (but the opposite case may be possible). The identifying module 115 may, for example, compare the difference between two representative values (i.e., the first and second representative values) with a characteristic threshold, and determine the test result according to the comparison result. For example, if the comparison result shows that the difference between the two representative values is less than the characteristic threshold, then the test result is a negative result. If the comparison result shows that the difference between the two representative values is greater than the characteristic threshold, then the test result is a positive result. Note that, the identifying module 115 may determine the characteristic threshold according to the statistics of known negative samples (i.e., test strip images identified as negative) and/or known positive samples (i.e., test strip images identified as positive). For example, a value of three standard deviations (based on a normal distribution) from the difference of multiple negative samples serves as the characteristic threshold.

Figure 8A:
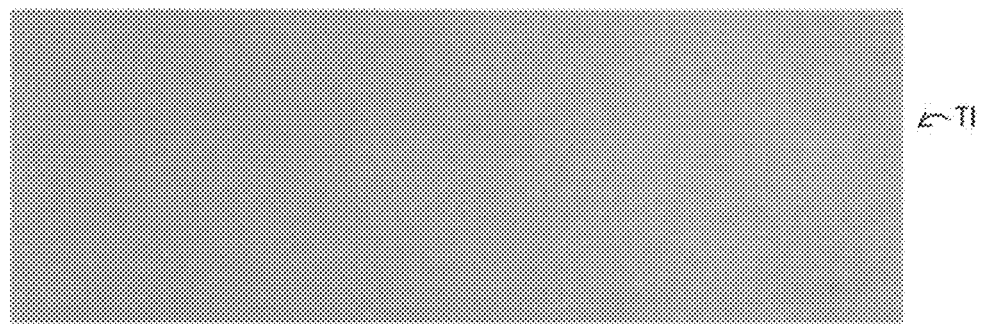
FIG. 8A is a schematic diagram of a test strip image under uneven light source distribution according to an embodiment of the disclosure.

In addition, the representative value may be further configured for light ray correction. FIG. 8A is a schematic diagram of a test strip image under uneven light source distribution according to an embodiment of the disclosure, and FIG. 8B is a schematic diagram of representative value distribution according to the embodiment of the disclosure.

Figure 8B:
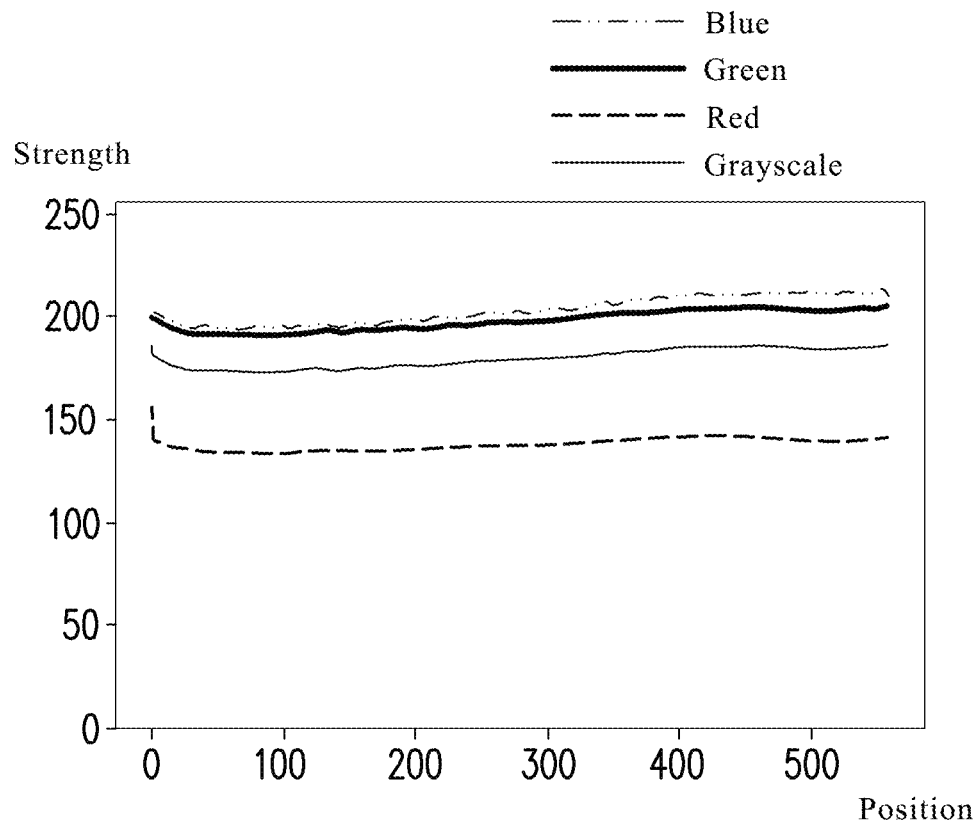
FIG. 8B is a schematic diagram of representative value distribution according to the embodiment of the disclosure.

With reference to FIG. 8A and FIG. 8B, assuming that the light source is projected on one side of the test strip, the capturing on the test strip may be affected by the uneven light source distribution. For example, in FIG. 8A, a test strip image TI is relatively bright on the right side, but slightly dark on the left side. In FIG. 8B, the representative values (taking the statistically representative value as an example) have a greater strength on the right side and a less strength on the left side. At this time, a curved line of the representative values is inclined. Notably, at this time, the test strip has not been used in a test.

Figure 8C:
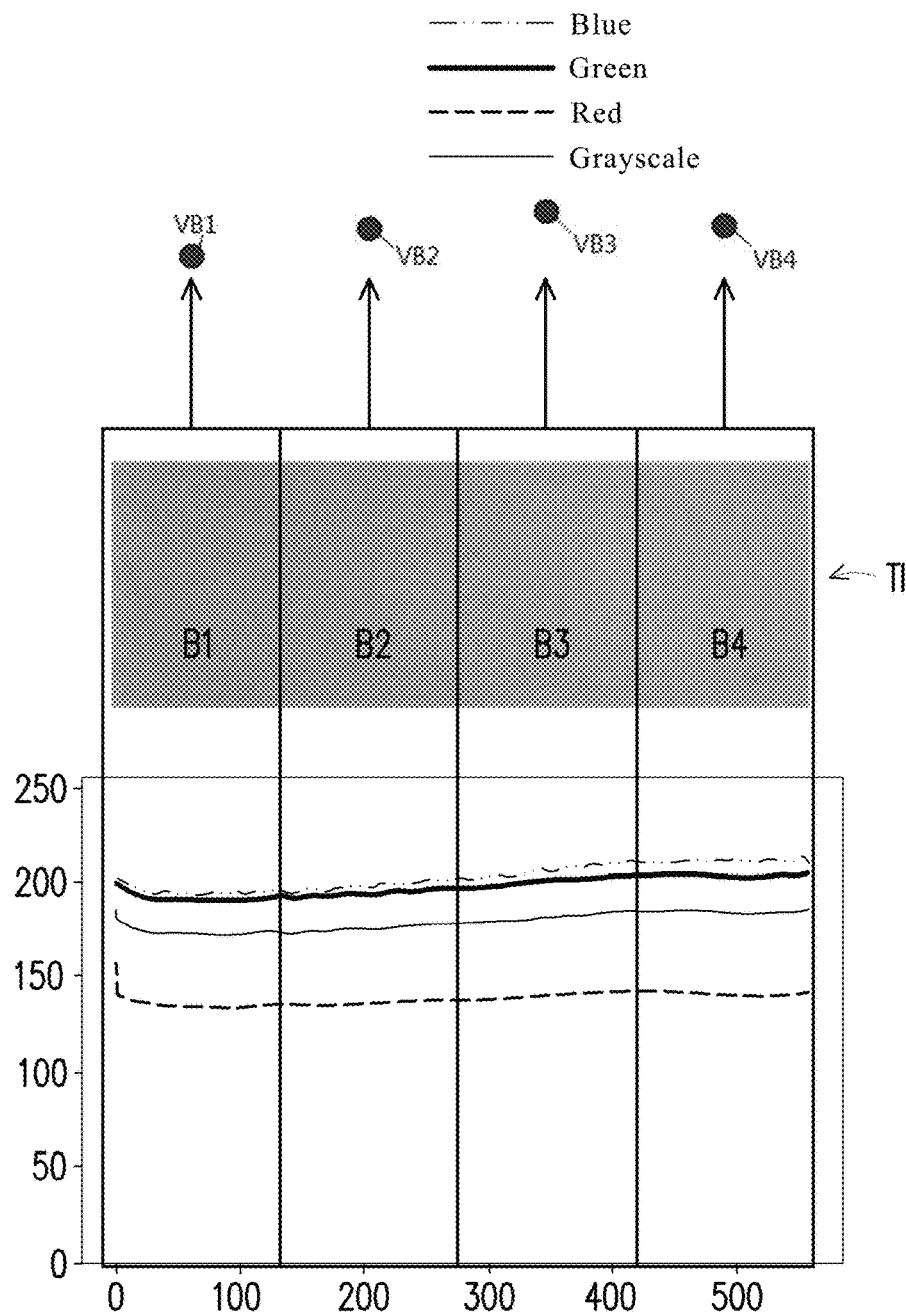
FIG. 8C is a schematic diagram of determining reference values according to an embodiment of the disclosure.

In an embodiment, the identifying module 115 may divide the test strip image into a plurality of main blocks on the first axis for the representative values. Taking FIG. 8A as an example, the test strip image TI is longitudinally divided. For example, FIG. 8C is a schematic diagram of determining reference values according to an embodiment of the disclosure. With reference to FIG. 8C, the test strip image TI includes the main blocks B1 to B4, and the main blocks B1 to B4 have approximately the same size. Note that, the size and number of the main blocks may be changed depending on actual requirements. The identifying module 115 may determine a reference value of the representative values in each main block. The reference value may be a statistic corresponding to the main block or a value obtained through other functions. Taking FIG. 8C as an example, reference values VB1 to VB4 of the main blocks B1 to B4 are the means of each or part of the representative values therein.

Figure 8D:
FIG. 8D is a schematic diagram of a curved line according to an embodiment of the disclosure.

The identifying module 115 may correct the representative values according to a curved line formed by the reference values of the main blocks and a target value. The target value is related to the brightness correction target. For example, the target value of red is 120, the target value of green is 180, and the target value of blue is 188. On the other hand, FIG. 8D is a schematic diagram of a curved line according to an embodiment of the disclosure. With reference to FIG. 8D, the identifying module 115 may perform curve fitting (e.g., interpolation or recursive analysis) on the reference values VB1 to VB4, and accordingly form a curved line FC through the reference values VB1 to VB4.

In some embodiments, the curved line FC may be expressed by an equation, for example, a third-order equation $ax^3+bx^2+cx+d=y$, where x represents the x-axis coordinates (corresponding to the first axis and positions), y represents the y-axis coordinates (corresponding to the second axis and representative values), and a, b, c, and d are coefficients. The identifying module 115 may obtain the value to be corrected for each position according to the strength difference between the target values of the primary colors and the curved line. Taking FIG. 8D as an example, the identifying module 115 substitutes the target value of red for y into the third-order equation to find the final value (i.e., the coefficient d). After substituting for a specific position (e.g., 10 for x) into the equation, the identifying module 115 may then obtain a new correction value (i.e., the value to be corrected to by increasing or decreasing) of the position. For other positions, the corresponding new correction values may also be obtained through similar substitutions.

After the new correction value of each position is obtained, the test strip may be provided for testing, and the image processing apparatus 100 may obtain the corresponding test strip image. The identifying module 115 may adjust the pixels on the test strip image according to the correction value of the corresponding positions. At this time, the same new correction value may be used for pixels in the same column or the same section (which may include multiple columns).

Figure 8E:
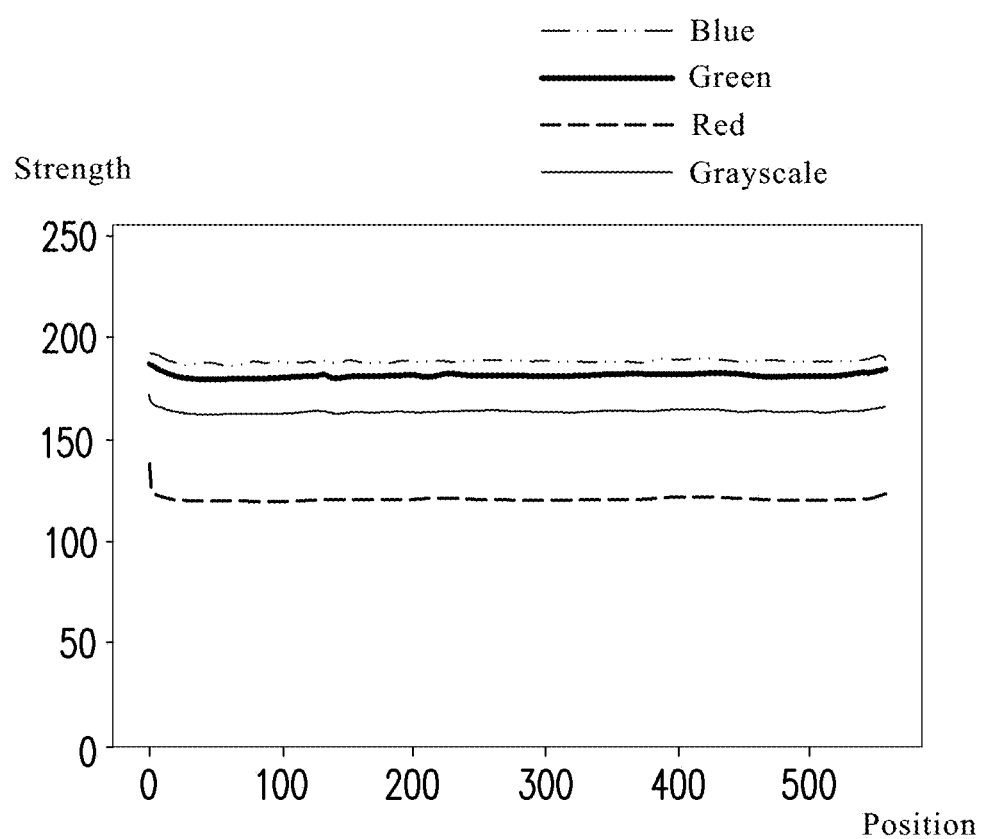
FIG. 8E is a schematic diagram of representative value distribution after light ray correction according to an embodiment of the disclosure.

FIG. 8E is a schematic diagram of representative value distribution after light ray correction according to an embodiment of the disclosure. With reference to FIG. 8E, after light ray correction, the strength of each primary color in FIG. 8E is close or identical to the target value.

In an embodiment, the identifying module 115 may calculate a ratio of the statistically representative value to the target value, and use the same ratio to adjust the strength of pixels in the same column or the same section. In other embodiments, the identifying module 115 may also adopt other brightness correction algorithms.

Figure 9:
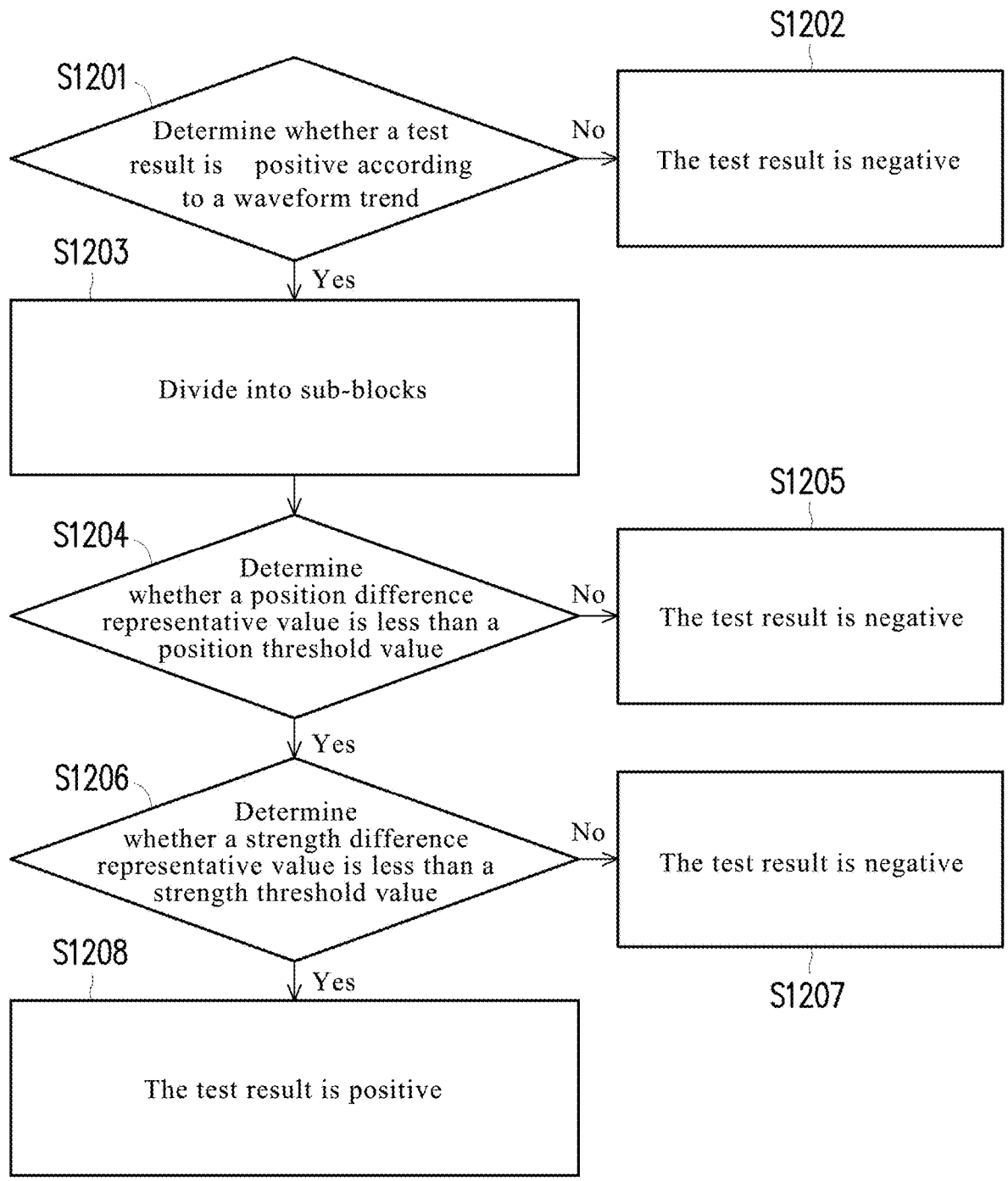
FIG. 9 is a flowchart of reaction identification according to an embodiment of the disclosure.

In addition, the representative value may also serve to exclude false-positive results. In some application scenarios, some test strips identified as positive are actually negative. FIG. 9 is a flowchart of reaction identification according to an embodiment of the disclosure. With reference to FIG. 9, the identifying module 115 may determine a waveform trend of the first representative value and the second representative value, and determine the test result (e.g., whether it is positive) according to the waveform trend (step S1201). Specifically, the waveform trend is a strength trend from the first representative value to the second representative value on the first axis. In this embodiment, the difference between the first representative value and the second representative value is the waveform trend. Assuming that the first representative value is the greatest value and the second representative value is the least value. The waveform may be in a shape of the connecting line of each of the representative values. Since the positive reaction region in the test strip is in a darker color than the surroundings, based on the representative values (e.g., the finite difference includes subtracting the value in the right position from the value in the left position), the waveform trend of the representative values should be first greater and then less from left to right.

FIG. 10A to FIG. 10E are each a schematic diagram of a waveform trend according to an embodiment of the disclosure. Taking the difference representative value as an example, with reference to FIG. 10A, in a main block B5, the identifying module 115 may determine that the greatest value is a first representative value VH2, and determine that the least value is a second representative value VL2. Since the first representative value VH2 is located right to the second representative value VL2 (i.e., the strength is first less and then greater from left to right), the identifying module 115 may determine that the test strip exhibits a false-positive result, and accordingly determine that the test result is a negative result (step S1202).

Figure 10A:
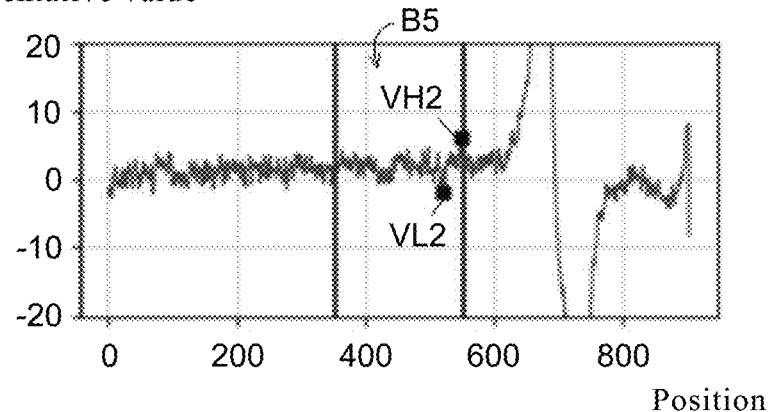
FIG. 10A to FIG. 10E are each a schematic diagram of a waveform trend according to an embodiment of the disclosure.
Figure 10B:
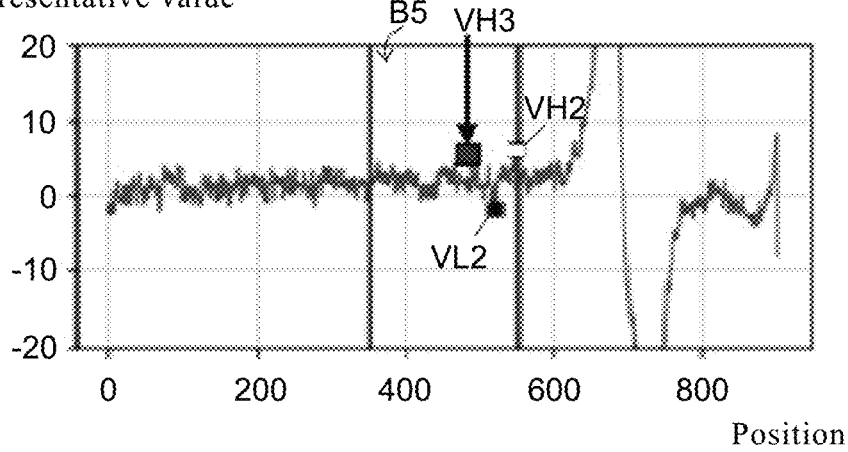

With reference to FIG. 10B, it is assumed that another first representative value VH3 greater than the first representative value VH2 is present in the main block B5. Since the first representative value VH3 is located left to the second representative value VL2 (i.e., the strength is first greater and then less from left to right), the identifying module 115 may further determine the test result through other mechanisms or directly identify the test result as positive.

Figure 10C:
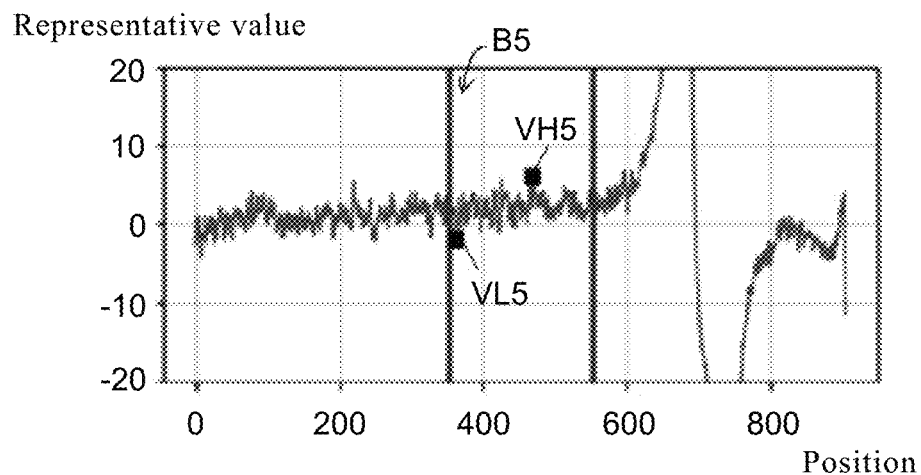

With reference to FIG. 10C, since a first representative value VH5 is located right to a second representative value VL5 (i.e., the strength is first less and then greater from left to right), the identifying module 115 may determine that the test result of the test strip is negative.

Figure 10D:
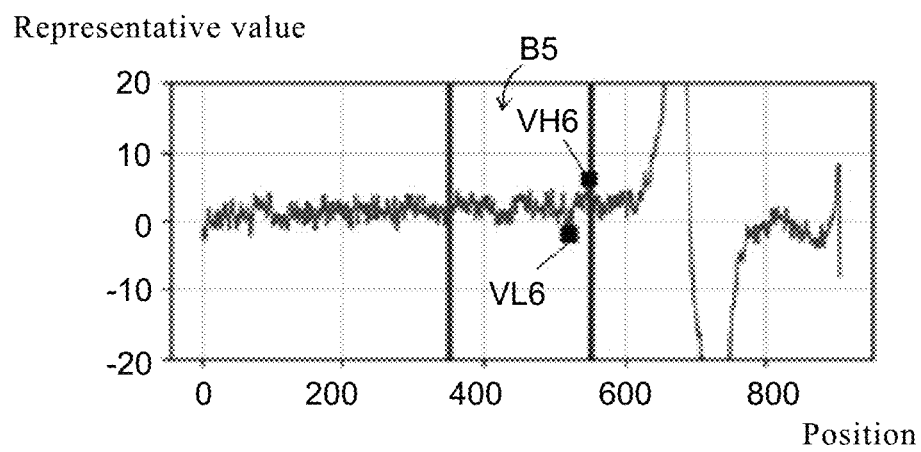

With reference to FIG. 10D, since a first representative value VH6 is located right to a second representative value VL6 (i.e., the strength is first less and then greater from left to right), the identifying module 115 may determine that the test result of the test strip is negative.

Figure 10E:
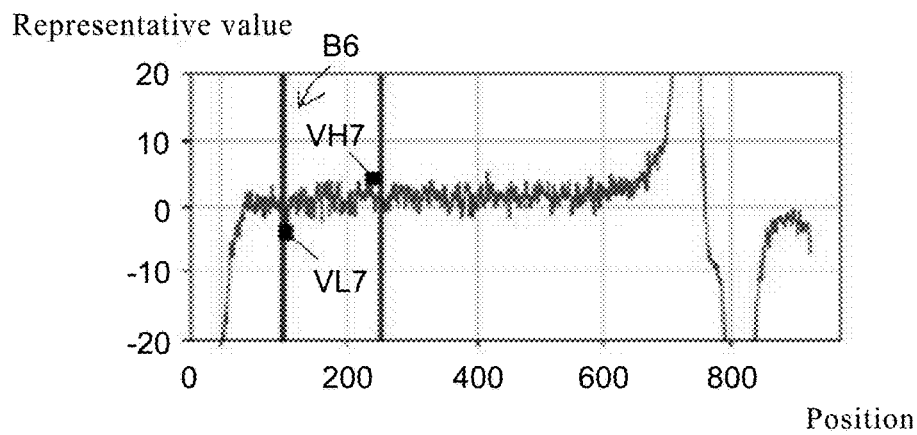

With reference to FIG. 10E, in a main block B6, since a first representative value VH7 is located right to a second representative value VL7 (i.e., the strength is first less and then greater from left to right), the identifying module 115 may determine that the test result of the test strip is negative. Filtering the false-positive results facilitates improvement of the identification accuracy.

Figure 11:
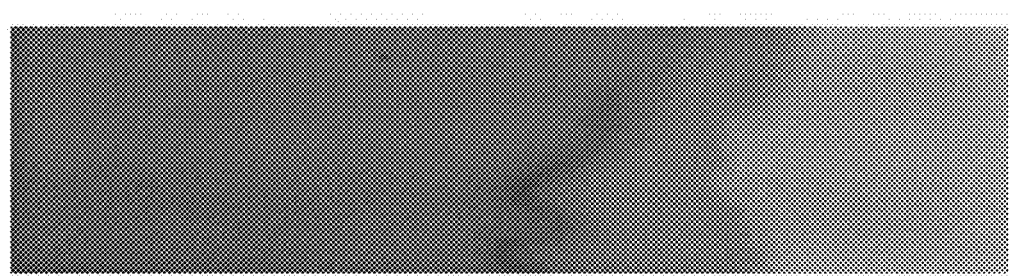
FIG. 11 is an example showing unevenness of reaction.

In some application scenarios, with reference to FIG. 11, which is an example showing unevenness of reaction, when a reagent spreads through the test strip from left to right, unevenness may be present in an early stage, thereby increasing the probability of misjudgment.

To filter the false-positive cases due to unevenness, in an embodiment, the identifying module 115 may determine a position difference between the first representative value and the second representative value, and determine the test result according to the position difference. Specifically, the position difference is the difference between the positions of the first representative value and the second representative value on the first axis. In this embodiment, the difference between the first representative value and the second representative value is the position difference.

Figure 12A:
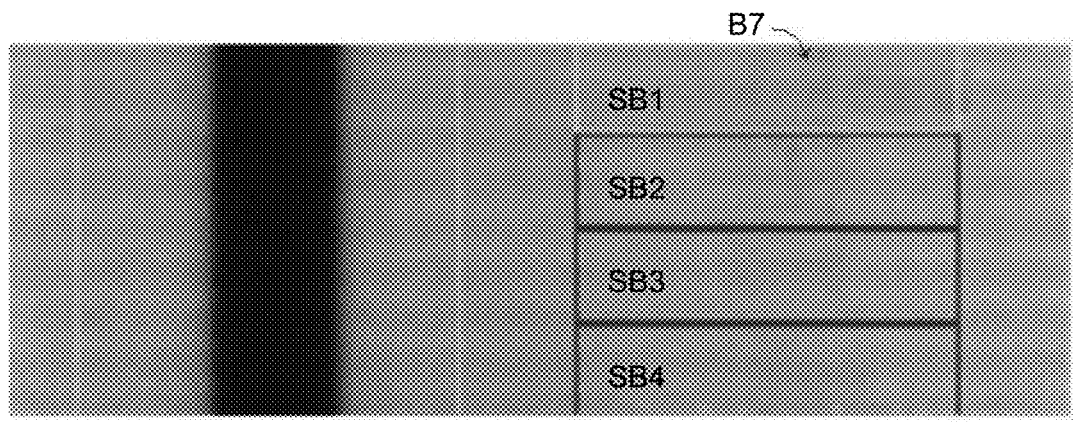
FIG. 12A is a schematic diagram of sub-region division according to an embodiment of the disclosure.

The identifying module 115 may divide the reaction region (which may correspond to one or more main blocks) into a plurality of sub-regions on the second axis (step S1203). That is, the main block is divided laterally. For example, FIG. 12A is a schematic diagram of sub-region division according to an embodiment of the disclosure. With reference to FIG. 12A, a main block B7 includes four sub-blocks SB1 to SB4. Note that, the height and number of sub-blocks SB1 to SB4 may be changed depending on actual requirements.

Figure 12B:
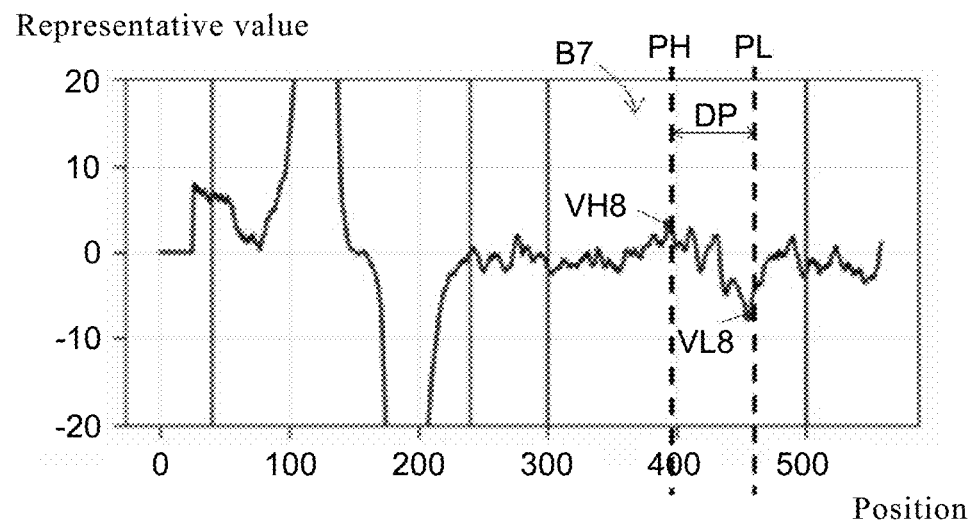
FIG. 12B is a schematic diagram of a position difference according to an embodiment of the disclosure.

The identifying module 115 may determine the first representative value and second representative value from one or more of the sub-blocks, and determine the position difference between the first representative value and the second representative value. For example, FIG. 12B is a schematic diagram of a position difference according to an embodiment of the disclosure. With reference to FIG. 12B, for a certain sub-block (e.g., the sub-block SB1 of FIG. 12A), the identifying module 115 determines a first representative value VH8 and a second representative value VL8, and determines a position difference DP between positions PH, PL thereof on the first axis (i.e., the lateral direction of the drawing).

In an embodiment, the identifying module 115 may generate a comparison result by comparing a second difference between two of the differences (the position differences in this embodiment) of the sub-regions with a position threshold. For example, the identifying module 115 selects the greatest one and the least one of the position differences from the sub-blocks, and takes a difference between the greatest one and the least one as the second difference. For another example, the identifying module 115 selects any two from the sub-blocks.

In an embodiment, the identifying module 115 may determine whether a position difference representative value is less than the position threshold (step S1204). The position difference representative value may be the second difference between two of the position differences of the sub-regions, or a value obtained from dividing the second difference by one of the selected two of the sub-regions. For example, a formula for the position difference representative value is: (max_line_position−min_line_position)/max_line_position*100%, where max_line_position is the greatest one of the sub-region, and min_line_position is the least one of the sub-region. Taking FIG. 12A as an example, it is assumed that the position difference of the sub-region SB1 is 60, the position difference of the sub-region SB2 is 70, the position difference of the sub-region SB3 is 55, and the position difference of the sub-region SB4 is 65. The position difference representative value is (70−55)/70*100%=21.429%.

On the other hand, the identifying module 115 may determine the position threshold according to the statistics of known negative samples and/or known positive samples. For example, a value of three standard deviations (based on a normal distribution) from the position difference representative value of multiple negative samples serves as the position threshold.

The identifying module 115 may determine the test result according to the comparison result between the position difference representative value (related to the second difference) and the position threshold. If the comparison result shows that the position difference representative value is less than the position threshold, the identifying module 115 may determine that the test result of the test strip is a negative result (step S1205). If the comparison result shows that the position difference representative value is greater than the position threshold, the identifying module 115 may further determine the test result through other mechanisms or directly identify the test result as positive.

Figure 12C:
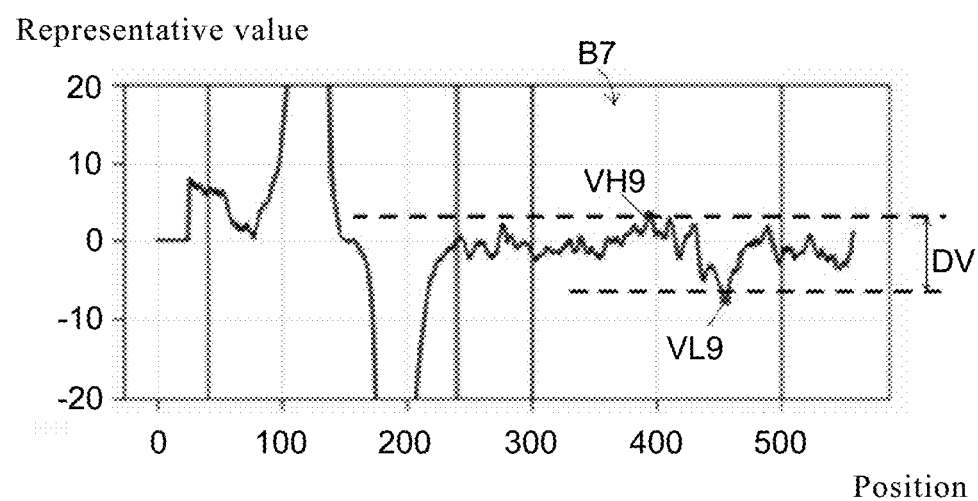
FIG. 12C is a schematic diagram of a strength difference according to an embodiment of the disclosure.

In an embodiment, the identifying module 115 may determine a strength difference between the first representative value and the second representative value, and determine the test result according to the strength difference. Specifically, the strength difference is a difference between the first representative value and the second representative value. In this embodiment, the difference between the first representative value and the second representative value is the strength difference. Similarly, the identifying module 115 may divide the reaction region (which may correspond to one or more main blocks) into a plurality of sub-regions on the second axis. In addition, the identifying module 115 may determine the first representative value and second representative value from one or more of the sub-blocks, and determine the strength difference between the first representative value and the second representative value. For example, FIG. 12C is a schematic diagram of a strength difference according to an embodiment of the disclosure. With reference to FIG. 12C, for a certain sub-block (e.g., the sub-block SB2 of FIG. 12A), the identifying module 115 determines a first representative value VH9 and a second representative value VL9, and determines a strength difference DV in strength/value thereof.

In an embodiment, the identifying module 115 may generate a comparison result by comparing a second difference between two of the differences (the strength differences in this embodiment) of the sub-regions with a strength threshold. For example, the identifying module 115 selects the greatest one and the least one of the strength differences from the sub-blocks, and takes a difference between the greatest one and the least one as the second difference. For another example, the identifying module 115 selects any two from the sub-blocks.

In an embodiment, the identifying module 115 may determine whether a strength difference representative value is less than the strength threshold (step S1206). The strength difference representative value may be the second difference between two of the strength differences of the sub-regions, or a value obtained from dividing the second difference by one of the selected two of the sub-regions. For example, a formula for the strength difference representative value is: (max_strength_distance−min_strength_distance)/max_strength_position*100%, where max_strength_distance is the greatest one of the sub-region, and min_strength_distance is the least one of the sub-region. Taking FIG. 12A as an example, it is assumed that the strength difference of the sub-region SB1 is 9, the strength difference of the sub-region SB2 is 10, the strength difference of the sub-region SB3 is 11, and the strength difference of the sub-region SB4 is 11. The strength difference representative value is (11−9)/11*100%=18.182%.

On the other hand, the identifying module 115 may determine the strength threshold according to the statistics of known negative samples and/or known positive samples. For example, a value of three standard deviations (based on a normal distribution) from the strength difference representative value of multiple negative samples serves as the strength threshold.

The identifying module 115 may determine the test result according to the comparison result between the strength difference representative value (related to the second difference) and the strength threshold. If the comparison result shows that the strength difference representative value is less than the strength threshold, the identifying module 115 may determine that the test result of the test strip is a negative result (step S1207). If the comparison result shows that the strength difference representative value is greater than the strength threshold, the identifying module 115 may further determine the test result through other mechanisms or directly identify the test result as positive (step S1208).

Note that, the sequence of steps S1201, S1204, S1206 may be changed. In addition, in some embodiments, as long as any one or any two of steps S1201, S1204, S1206 is met (i.e., determined as yes), it may be determined that the test result is a positive result. In other embodiments, the identifying module 115 may ignore/disable at least one of steps S1201, S1204, S1206.

In summary of the foregoing, in the image processing apparatus and image-based test strip identification method of the embodiment, image features can be enhanced, representative values can be obtained by data dimensionality reduction, and false-positive results can be filtered. Accordingly, the identification accuracy of positive results or negative results of the test strip can be increased.

It will be apparent to the skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image-based test strip identification method, comprising:
    obtaining, by an image capturing apparatus, an image of a test strip while the test strip is not been used in a test;
    dividing the image into a plurality of main blocks on a first axis;
    calculating representative values of the image;
    calculating a mean of the representative values of the image in each of the main blocks as a reference value;
    performing curve fitting on the reference values of the main blocks to form a curved line;
    calculating a correction value of each of a plurality of positions of the image based on a difference between a target value and the curved line;
    obtaining, by the image capturing apparatus, a test strip image;
    adjusting pixels of the test strip image according to the correction values at the corresponding positions;
    longitudinally dividing, by a processor, the test strip image into a plurality of sections along the first axis, wherein the test strip image is obtained by capturing the test strip, a second axis parallel to a test line or a control line of the test strip is perpendicular to the first axis;

calculating, by the processor, a mean of the pixels in each of the sections as one of a plurality of statistically representative values, wherein each of the statistically representative values corresponds to one of the sections divided from the test strip image on the first axis;

performing, by the processor, a finite difference on two of the plurality of statistically representative values spaced by a stride distance via dividing a difference between the two of the statistically representative values by the stride distance on the first axis, wherein a calculated result of the finite difference is one of a plurality of representative values of the test strip image, such that the representative values and the sections are in a one-to-one mapping, thereby converting two-dimensional data of the test strip image into one-dimensional data, wherein the stride distance is less than a width of the test line or the control line on the first axis, wherein the stride distance is shifted in a direction of the first axis to calculate another one of the representative values; and determining, by the processor, a test result of the test strip according to a difference between a first representative value and a second representative value of the representative values of the test strip image, wherein the test result comprises a positive result and a negative result.

2. The image-based test strip identification method described in claim 1, wherein the step of determining the test result of the test strip according to the difference between the first representative value and the second representative value of the representative values comprises:

determining at least one of a waveform trend, a position difference, and a strength difference of the first representative value and the second representative value, wherein the difference is the waveform trend, the position difference, or the strength difference, the waveform trend is a strength trend from the first representative value to the second representative value on the first axis, the position difference is a difference between positions of the first representative value and the second representative value on the first axis, the strength difference is a difference between values of the first representative value and the second representative value, the first representative value is the greatest one of the representative values, and the second representative value is the least one of the representative values; and determining the test result according to at least one of the waveform trend, the position difference, and the strength difference.

3. The image-based test strip identification method described in claim 2, further comprising:

dividing the test strip image into a plurality of main blocks on the first axis for the representative values; and determining the first representative value and the second representative value from one of the main blocks of the test strip image.

4. The image-based test strip identification method described in claim 3, wherein the step of determining the first representative value and the second representative value from the main blocks comprises:

dividing one of the main blocks of the test strip image into a plurality of sub-blocks on the second axis; and determining the first representative value and the second representative value from one of the sub-blocks.

5. The image-based test strip identification method described in claim 4, wherein the step of determining the test result according to at least one of the waveform trend, the position difference, and the strength difference further comprises:

generating a comparison result by comparing a second difference between two of the differences of the sub-blocks with a threshold; and determining the test result according to the comparison result.

6. The image-based test strip identification method described in claim 1, wherein the image-based test strip identification method is performed by the processor of a medical testing instrument.

7. An image processing apparatus, comprising:

an image capturing apparatus, configured to obtain an image of a test strip while the test strip is not been used in a test and a test strip image;

a storage device, storing a programming code; and a processor, coupled to the storage device, and configured to be loaded with the programming code to:

divide the image into a plurality of main blocks on a first axis;

calculate representative values of the image;

calculate a mean of the representative values of the image in each of the main blocks as a reference value;

perform curve fitting on the reference values of the main blocks to form a curved line;

calculating a correction value of each of a plurality of positions of the image based on a difference between a target value and the curved line;

adjust pixels of the test strip image according to the correction values at the corresponding positions;

longitudinally divide the test strip image into a plurality of sections along the first axis, wherein the test strip image is obtained by capturing the test strip, and a second axis parallel to a test line or a control line of the test strip is perpendicular to the first axis;

calculate a mean of the pixels in each of the sections as one of a plurality of statistically representative values, wherein each of the statistically representative values corresponds to one of the sections divided from the test strip image on the first axis;

perform a finite difference on two of the plurality of statistically representative values spaced by a stride distance via dividing a difference between the two of the statistically representative values by the stride distance on the first axis, wherein a calculated result of the finite difference is one of a plurality of representative values of the test strip image, such that the representative values and the sections are in a one-to-one mapping, thereby converting two-dimensional data of the test strip image into one-dimensional data, wherein the stride distance is less than a width of the test line or the control line on the first axis, wherein the stride distance is shifted in a direction of the first axis to calculate another one of the representative values; and determine a test result of the test strip according to a difference between a first representative value and a second representative value of the representative values of the test strip image, wherein the test result comprises a positive result and a negative result.

8. The image processing apparatus described in claim 7, wherein the processor is further configured to:

determine at least one of a waveform trend, a position difference, and a strength difference of the first representative value and the second representative value, wherein the difference is the waveform trend, the position difference, or the strength difference, the waveform trend is a strength trend from the first representative value to the second representative value on the first axis, the position difference is a difference between positions of the first representative value and the second representative value on the first axis, the strength difference is a difference between values of the first representative value and the second representative value, the first representative value is the greatest one of the representative values, and the second representative value is the least one of the representative values; and determine the test result according to at least one of the waveform trend, the position difference, and the strength difference.

9. The image processing apparatus described in claim 8, wherein the processor is further configured to:

divide the test strip image into a plurality of main blocks on the first axis for the representative values; and determine the first representative value and the second representative value from one of the main blocks of the test strip image.

10. The image processing apparatus described in claim 9, wherein the processor is further configured to:

divide one of the main blocks of the test strip image into a plurality of sub-blocks on the second axis; and determine the first representative value and the second representative value from one of the sub-blocks.

11. The image processing apparatus described in claim 10, wherein the processor is further configured to:

generate a comparison result by comparing a second difference between two of the differences of the sub-blocks with a threshold; and determine the test result according to the comparison result.

* * * * *